(12) United States Patent
Abe

(10) Patent No.: US 8,078,003 B2
(45) Date of Patent: Dec. 13, 2011

(54) BIOMETRIC IMAGE PROCESSING APPARATUS, BIOMETRIC IMAGE ACQUISITION METHOD, AND BIOMETRIC AUTHENTICATION PROGRAM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1091 days.

(21) Appl. No.: 11/873,594

(22) Filed: Oct. 17, 2007

(65) Prior Publication Data

US 2008/0095463 A1 Apr. 24, 2008

(30) Foreign Application Priority Data

Oct. 19, 2006 (JP) ................. P2006-285352

(51) Int. Cl.
*G06K 9/36* (2006.01)
(52) U.S. Cl. ......... 382/276; 382/115; 382/124; 382/128
(58) Field of Classification Search ................... 382/276
See application file for complete search history.

(56) References Cited

U.S. PATENT DOCUMENTS

| | | | | |
|---|---|---|---|---|
| 5,198,669 | A * | 3/1993 | Namiki et al. | 250/587 |
| 5,594,807 | A * | 1/1997 | Liu | 382/128 |
| 5,748,802 | A * | 5/1998 | Winkelman | 382/271 |
| 6,097,849 | A * | 8/2000 | Nevis | 382/274 |
| 6,252,931 | B1 * | 6/2001 | Aach et al. | 378/98.2 |
| 6,256,409 | B1 * | 7/2001 | Wang | 382/170 |
| 6,468,218 | B1 * | 10/2002 | Chen et al. | 600/443 |
| 6,674,915 | B1 * | 1/2004 | Wang | 382/263 |
| 6,687,416 | B2 * | 2/2004 | Wang | 382/278 |
| 2002/0039434 | A1 * | 4/2002 | Levin et al. | 382/128 |
| 2002/0126899 | A1 * | 9/2002 | Farrell | 382/199 |
| 2004/0240733 | A1 * | 12/2004 | Hobson et al. | 382/170 |
| 2005/0069217 | A1 * | 3/2005 | Mukherjee | 382/266 |
| 2005/0232506 | A1 * | 10/2005 | Smith et al. | 382/254 |
| 2009/0016643 | A1 * | 1/2009 | Johnson | 382/282 |
| 2009/0062666 | A1 * | 3/2009 | Roteliuk | 600/485 |
| 2009/0252413 | A1 * | 10/2009 | Hua et al. | 382/170 |
| 2010/0177973 | A1 * | 7/2010 | Wedi et al. | 382/233 |

FOREIGN PATENT DOCUMENTS

JP 2005-260738 9/2005

OTHER PUBLICATIONS

Atick, Joseph et al. "What Does the Retina Know about Natural Scenes", 1992, Neural Computation, vol. 4, p. 196-210.*
Bronzino, Joseph, "The Biomedical Engineering Handbook, Third Edition, Medical Devices and Systems", 2006, CRC Press, Ch. 28, p. 28-1-28-13.*

* cited by examiner

*Primary Examiner* — Bhavesh Mehta
*Assistant Examiner* — Gandhi Thirugnanam
(74) *Attorney, Agent, or Firm* — Finnegan, Henderson, Farabow, Garrett & Dunner, L.L.P.

(57) ABSTRACT

The present invention provides an image processing apparatus which acquires an image of quality desired for an object located in a biological body; sets up exposure values of a plurality of stages for an image pickup means; extracts the contour of an object in image signals output from the image pickup means; for the respective stages, generates first histograms for image signals before extraction and second histograms for image signals after extraction with a criterion representing the broadening of the distribution in the histograms set constant; calculates the amount of the kurtosis change between the first histograms and the second histograms; and selects, of the image signals after the extraction corresponding to the respective stages, an image signal after the extraction corresponding to one of the stages in which the amount of change is larger than a predetermined amount as an optimum image for an object.

5 Claims, 10 Drawing Sheets

US 8,078,003 B2

BIOMETRIC IMAGE PROCESSING APPARATUS, BIOMETRIC IMAGE ACQUISITION METHOD, AND BIOMETRIC AUTHENTICATION PROGRAM

CROSS REFERENCES TO RELATED APPLICATIONS

The present invention contains subject matter related to Japanese Patent Application JP2006-285352 filed in the Japanese Patent Office on Oct. 19, 2006, the entire contents of which being incorporated herein by reference.

BACKGROUND OF THE INVENTION

1. Field of the Invention

This invention relates to an image processing apparatus, an image acquisition method and a program which are desirably applied to the biometrics authentication, for example.

2. Description of the Related Art

As one of the biological characteristics, a blood vessel draws attention. An apparatus, which utilizes a blood vessel to generate data to be registered (referred to as registration data, hereinafter) or data to be collated (referred to as collation data, hereinafter) with respect to the registration data, generally picks up an image of a blood vessel at certain part of biological body, and, with respect to image data acquired as the image pickup result, performs various image processings to extract a formation pattern of blood vessel (referred to as blood vessel pattern, hereinafter) contained in the image data.

When picking up an image of a blood vessel, a near infrared ray is employed as light for the image pickup. Since a near infrared ray is specifically absorbed by deoxygenation hemoglobin (venous blood) or oxygenation hemoglobin (arterial blood) in a vessel tissue, a near infrared ray which is reflected and scattered at the inside of part of biological body and sent from the part of biological body comes to be a blood vessel projection light that projects a blood vessel. As shown in FIG. 10, a picked up image is substantially monotone, and the luminance value of pixels corresponding to a blood vessel pattern is acquired as a low value, while the luminance value of pixels corresponding to part of biological body other than the blood vessel pattern is acquired as a high value.

On the other hand, since blood vessels are in the inside of a biological body, the difference between the luminance value of pixels corresponding to a blood vessel pattern and the luminance value of pixels corresponding to part of biological body other than the blood vessel pattern is not obvious, that is, the blood vessel pattern becomes blurred.

In general, this blurred state is made clear by the contour extraction processing etc. On the other hand, due to the individual difference, since this processing is meaningless when a blood vessel pattern is not picked up, it is necessary to adjust the image pickup conditions such as the light amount of a near infrared ray and the exposure value of an image pickup means (camera) according to the individual difference.

Among these image pickup conditions, when paying attention to the exposure value of an image pickup means (camera), there has been suggested an exposure control method in Jpn. Pat. Appln. Laid-Open Publication No. 2005-260738 under which a photometry value of respective areas obtained by dividing a picked up image is weighted to calculate a temporary exposure value, and an exposure compensation amount is calculated based on the difference between a threshold value which is obtained by adding a predetermined value to the temporary exposure value and the maximum photometry value, and then the temporary exposure value is compensated using the exposure compensation amount.

SUMMARY OF THE INVENTION

Meanwhile, the picked up image (FIG. 10) of a blood vessel is substantially monotone, and is different from a normal object image since the difference between part corresponding to a blood vessel pattern and part corresponding to part of biological body other than the blood vessel pattern is not clear, and an area of a photometry value to be noticed is unclear. Accordingly, it becomes difficult to set up a suitable exposure for respective individuals, which consequently raises a problem that a blood vessel image of quality desired for respective individuals to be picked up is not acquired.

In view of the above-identified circumstances, it is therefore desirable to provide an image processing apparatus, an image acquisition method and a program which can acquire an image of quality desired for an object to be picked up even if the object to be picked up is located in the inside of a biological body.

According to an embodiment of the present invention, there is provided an image processing apparatus including: a setup means for setting up exposure values of a plurality of stages for an image pickup means; an extraction means for extracting the contour of an object in image signals output from the image pickup means; a generation means for generating first histograms for image signals before extraction and second histograms for image signals after extraction for the respective stages with the broadening of the distribution in the histograms set constant; a calculation means for calculating the amount of change between the kurtosis of the first histograms and the kurtosis of the second histograms for the respective stages; and a selection means for selecting, of the image signals after the extraction corresponding to the respective stages, an image signal after the extraction corresponding to one of the stages in which the amount of change is larger than a predetermined amount as an optimum image for an object to be picked up.

According to the image processing apparatus, by determining the luminance variation of images corresponding to the exposure values of the respective stages using the kurtosis of histograms thereof, even if picked up images are substantially monotone, the luminance variation can be correctly determined. Furthermore, for the respective stages, by determining the luminance variation of images before and after extracting the contour of an object, even if the picked up images are blurred, an image of an exposure value which is suitable for an object to be picked up can be accurately selected.

According to an embodiment of the present invention, there is also provided an image acquisition method that acquires an image picked up with the optimum exposure value with respect to an object to be picked up, the method including the steps of: a first step of setting up exposure values of a plurality of stages for an image pickup means; a second step of extracting the contour of an object in image signals output from the image pickup means; a third step of generating first histograms for image signals before extraction and second histograms for image signals after extraction for the respective stages with the broadening of the distribution in the histograms set constant; a fourth step of calculating the amount of change between the kurtosis of the first histograms and the kurtosis of the second histograms for the respective stages; and a fifth step of selecting, of the image signals after the extraction corresponding to the respective stages, an image signal after the extraction corresponding to one of the stages in which the amount of change is larger than a predetermined amount as an optimum image for an object to be picked up.

According to the image acquisition method, by determining the luminance variation of images corresponding to the exposure values of the respective stages using the kurtosis of histograms thereof, even if picked up images are substantially monotone, the luminance variation can be correctly determined. Furthermore, for the respective stages, by determining the luminance variation of images before and after extracting the contour of an object, even if the picked up images are blurred, an image of an exposure value which is suitable for an object to be picked up can be accurately selected.

According to an embodiment of the present invention, there is also provided a program including the steps of: setting up exposure values of a plurality of stages for an image pickup means; making a control means for controlling the image pickup means extract the contour of an object in image signals output from the image pickup means; making the control means generate first histograms for image signals before extraction and second histograms for image signals after extraction for the respective stages with the broadening of the distribution in the histograms set constant; making the control means calculate the amount of change between the kurtosis of the first histograms and the kurtosis of the second histograms for the respective stages; and making the control means select, of the image signals after the extraction corresponding to the respective stages, an image signal after the extraction corresponding to one of the stages in which the amount of change is larger than a predetermined amount as an optimum image for an object to be picked up.

According to the program, by determining the luminance variation of images corresponding to the exposure values of the respective stages using the kurtosis of histograms thereof, even if picked up images are substantially monotone, the luminance variation can be correctly determined. Furthermore, for the respective stages, by determining the luminance variation of images before and after extracting the contour of an object, even if the object of the picked up images is blurred, an image of an exposure value which is suitable for an object to be picked up can be accurately selected.

According to the present invention, for exposure values of respective stages, by obtaining the amount of change of the kurtosis of histograms of images before and after extracting the contour of an object, and selecting an image signal after the extraction corresponding to one of the stages in which the amount of change is larger than a predetermined amount as an optimum image for an object to be picked up, even if picked up images are substantially monotone, and even if the object of the picked up images is blurred, an image of an exposure value which is suitable for an object to be picked up can be accurately selected, which can realize an image processing apparatus, an image acquisition method and a program which can acquire an image of quality desired for an object to be picked up even if the object to be picked up is located at the inside of a biological body.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, embodiments of the present invention will be described in greater detail by referring to the accompanying drawings.

(1) Overall Configuration of Authentication Apparatus in this Embodiment

Figure 1:
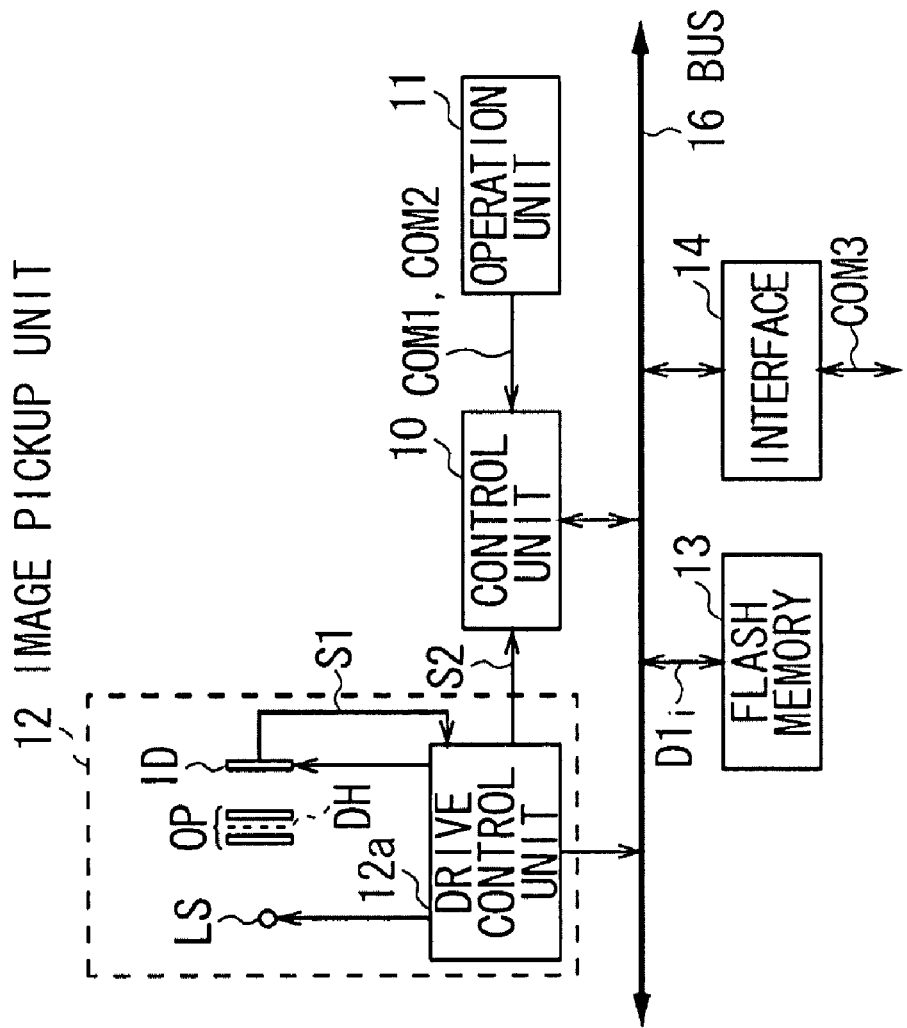
FIG. 1 shows a block diagram indicative of the configuration of an authentication apparatus according to an embodiment of the present invention.

FIG. 1 shows a block diagram indicative of the configuration of an authentication apparatus 1 according to an embodiment of the present invention. The authentication apparatus 1 includes a control unit 10, and further includes an operation unit 11, image pickup unit 12, flash memory 13, interface 14, and notification unit 15, which are connected to the control unit 10 through a bus 16.

The control unit 10 is a microcomputer including a Central Processing Unit (CPU) which controls the entire authentication apparatus 1, a Read Only Memory (ROM) in which various programs and setup information are stored, and a Random Access Memory (RAM) which works as a work memory of the CPU.

To this control unit 10, an execution command COM1 for a mode to register a blood vessel (referred to as blood vessel registration mode, hereinafter) of a user to be registered (referred to as registrant, hereinafter), or an execution command COM2 for a mode to judge the existence or nonexistence of a registrant (referred to as authentication mode, hereinafter) is sent from the operation unit 11 according to the operation of the user.

The control unit 10 determines a mode to be executed based on the execution commands COM1, COM2, and arbitrarily controls the image pickup unit 12, flash memory 13, interface 14, and notification unit 15 based on a program corresponding to the determination result so as to execute the blood vessel registration mode or authentication rode.

(1-1) Blood Vessel Registration Mode

Specifically, in case of determining the blood vessel registration mode as a mode to be executed, the control unit 10 sets the operation mode to the blood vessel registration mode, and controls the image pickup unit 12.

In this case, a drive control unit 12a of the image pickup unit 12 drives and controls one or more near infrared ray light sources LS for irradiating a near infrared ray to a predetermined position in the authentication apparatus 1, and an image pickup element ID being a Charge Coupled Device (CCD).

The drive control unit 12a adjusts the lens position of an optical lens in an optical system OP such that an object to be picked up is brought into focus. Furthermore, based on an exposure value (EV value) set up by the control unit 10, the drive control unit 12a adjusts the diaphragm value of a diaphragm DH, and adjusts the shutter speed (exposure time) with respect to the image pickup element ID.

The image pickup element ID performs the photoelectric conversion for a near infrared ray which is irradiated to an object arranged at a predetermined position, and is made to pass through the object, optical system OP, and diaphragm DH in series to go thereto, and supplies the photoelectric conversion result to the control unit 10 through the drive control unit 12a as an image signal S1.

The control unit 10 performs a predetermined image processing for the image signal S1 to extract an object pattern in the image, and registers the object pattern by storing the object pattern in the flash memory 13 as registration data DIS to identify a registrant.

In case the object is a finger of a biological body, a near infrared ray which is irradiated from the near infrared ray light source LS to the finger is reflected and scattered at the inside of the finger to be sent therefrom, and is made to go to the image pickup element ID as a blood vessel projection light that projects a blood vessel of the finger. Then, from the image signal S1 output from the image pickup element ID, a blood vessel pattern contained in the image is extracted, and thus extracted blood vessel pattern is registered as the registration data DIS.

In this way, the control unit 10 can perform the blood vessel registration mode.

(1-1) Authentication Mode

On the other hand, in case of determining the authentication mode as a mode to be executed, the control unit 10 sets the operation mode to the authentication mode, and controls the image pickup unit 12 in the same way as the case of the blood vessel registration mode.

In this case, similar to the case of the blood vessel registration mode, the image pickup unit 12 adjusts the lens position of an optical lens in the optical system OP, and, based on an exposure value set up by the control unit 10, adjusts the diaphragm value of the diaphragm DH, and the shutter speed with respect to the image pickup element ID, and then supplies an image signal S2 which is output from the image pickup element ID to the control unit 10 after the adjustment.

The control unit 10 performs the same image processing, which is performed in the above-described blood vessel registration mode, for the image signal S2, and reads out the registration data DIS registered in the flash memory 13.

Then, the control unit 10 collates an object pattern which is extracted as the image processing result and an object pattern (blood vessel pattern) of the registration data DIS read out from the flash memory 13, and judges whether or not a person of the extracted object pattern is a registrant (qualified user) according to the degree of coincidence.

Then, when it is determined that the person is a registrant, the control unit 10 generates an execution command COM3 to make an operation processing apparatus, not shown, connected to the interface 14 carry out a predetermined operation, and transfers thus generated execution command COM3 to the operation processing apparatus through the interface 14.

As an embodiment of the operation processing apparatus connected to the interface 14, in case of employing a door that is locked for example, the control unit 10 transfers the execution command COM3 to unlock the door to the door. Furthermore, as another embodiment of the operation processing apparatus, in case of employing a computer in a state under which, among plural operation modes, some operation modes are restricted, the control unit 10 transfers the execution command COM3 to make the restricted operation modes unrestricted to the computer.

As the embodiments, two examples are explained, to which the embodiment is not restricted, and other embodiments can be arbitrarily selected. Furthermore, in these embodiments, while the operation processing apparatus is connected to the interface 14, the configuration of software and hardware of the operation processing apparatus may be loaded on the authentication apparatus 1.

On the other hand, when it is determined that the person is not a registrant, the control unit 10 displays this determination on a display unit 15a of the notification unit 15, and concurrently outputs a voice through a voice output unit 15b of the notification unit 15 so as to visually and aurally notifies that the person is not a registrant.

In this way, the control unit 10 can perform the authentication mode.

(2) Specific Processing Contents of Image Processing

Figure 2:
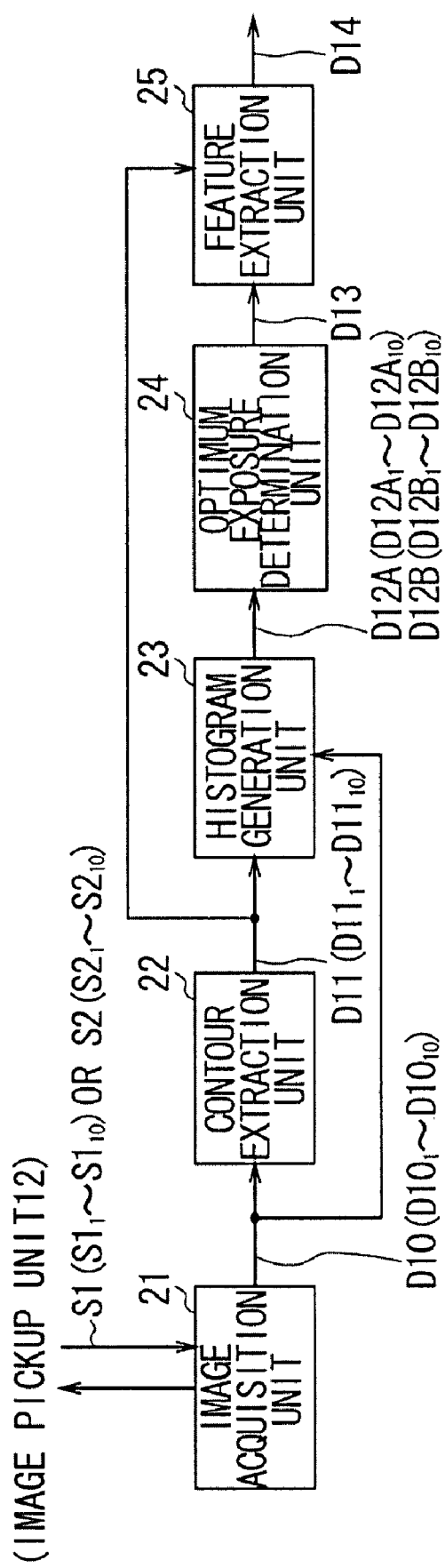
FIG. 2 shows a block diagram indicative of the contents of the image processing in a control unit.

Next, the contents of the image processing in the control unit 10 will be explained specifically. This image processing can be functionally performed by an image acquisition unit 21, contour extraction unit 22, histogram generation unit 23, optimum exposure determination unit 24, and feature extraction unit 25, as shown in FIG. 2. Hereinafter, the image acquisition unit 21, contour extraction unit 22, histogram generation unit 23, optimum exposure determination unit 24, and feature extraction unit 25 will be explained. For the sake of convenience, it is assumed that the image signal S1 or S2 supplied from the image pickup unit 12 is acquired by picking up an image of a finger of a biological body.

(2-1) Image Acquisition Processing

The image acquisition unit 21 sets up exposure values of ten stages in series every predetermined term for the drive control unit 12a (FIG. 1) of the image pickup unit 12, and makes the drive control unit 12a pick up an image of an object to be picked up under these exposure values. As the image pickup result corresponding to these stages, in case of the blood vessel registration mode, image signals $S1_1$ to $S1_{10}$ output from the image pickup unit 12 are input to the image acquisition unit 21, while in case of the authentication mode, image signals $S2_1$ to $S2_{10}$ output from the image pickup unit 12 are input to the image acquisition unit 21.

Then, the image acquisition unit 21 performs the Analog/Digital (A/D) conversion processing for the image signals $S1_1$ to $S1_{10}$ or image signals $S2_1$ to $S2_{10}$ corresponding to these stages, and sends image data $D10_1$ to $D10_{10}$ which are acquired as the result of the A/D conversion processing to the contour extraction unit 22 and the histogram generation unit 23.

(2-2) Contour Extraction Processing

The contour extraction unit 22 performs the filter processing to enhance the contrast for the image data $D10_1$ to $D10_{10}$ so as to extract the contour of a blood vessel pattern. Specifically, from images of the image data $D10_1$ to $D10_{10}$, the contour extraction unit 22 extracts images of a predetermined size corresponding to the finger region part, and performs the filter processing to enhance the contrast for thus extracted images respectively.

In case of this embodiment, in the contour extraction unit 22, when the spacial frequency is set to "f" and the cutoff frequency is set to "$f_0$", a filter F(f) represented by the following mathematical expression (1) is employed.

$$F(f) = W(f) \cdot L(f) = f \cdot \exp\left(-\left(\frac{f}{f_0}\right)^4\right) \quad (1)$$

In the mathematical expression (1), since the spectrum in a natural image is proportional to 1/f, in the term "W(f)", an effect of setting the spectrum constant is brought about by weakening the influence of low-frequency components and by intensifying the influence of high-frequency components, while in the term "L(f)", an effect of reducing the influence of high-frequency components such as noise is brought about.

Figure 3:
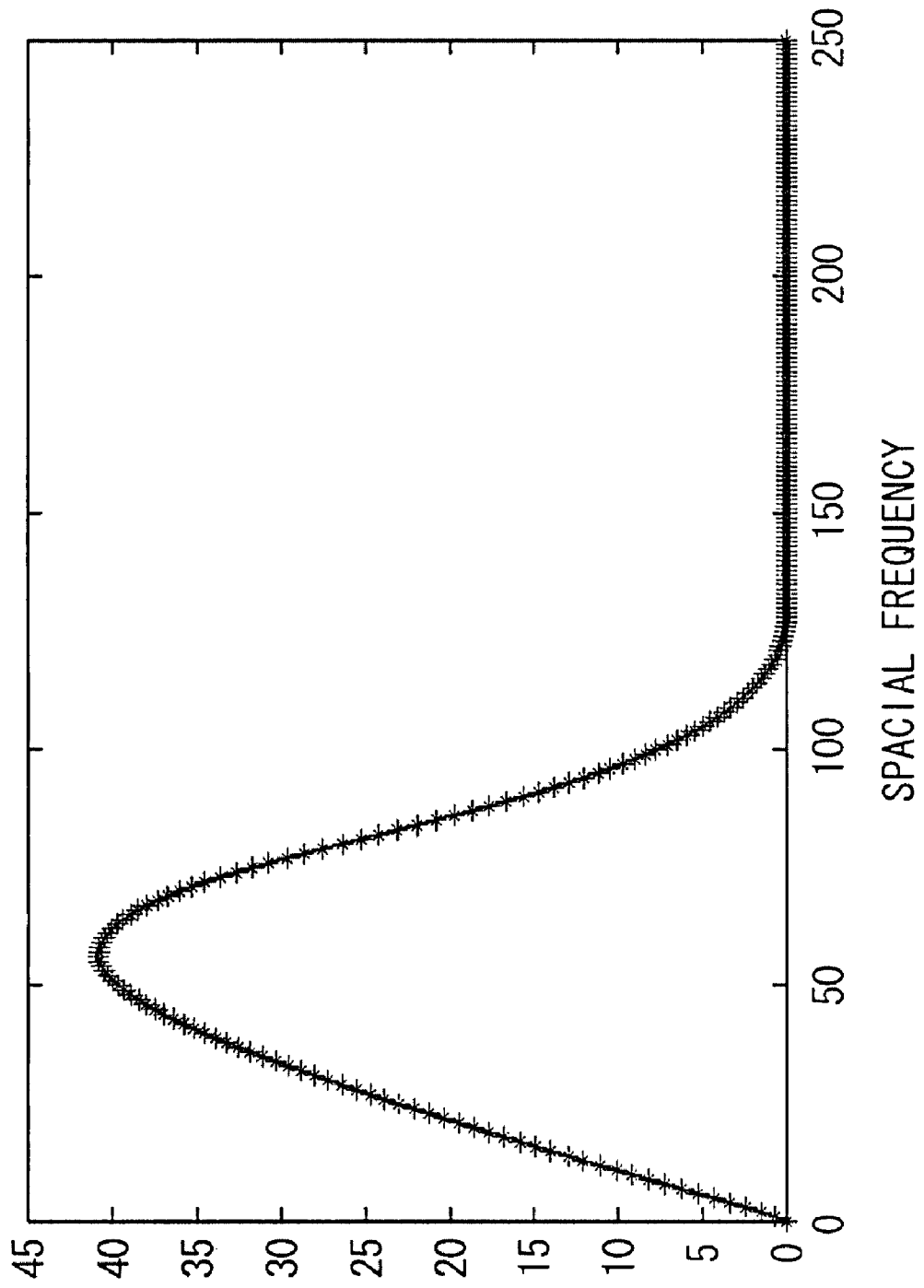
FIG. 3 shows a graph indicative of the filter characteristics.

Furthermore, the characteristics of the filter F(f) are shown in FIG. 3, and it is known that the characteristics are close to the spacial frequency characteristics of the ganglio cell in the retina of a human being (J. J. Atick and A. N. Redlich, "What does the retina know about natural scenes?" Neural Computation, Vol. 4, pp. 196-210 (1992)). Accordingly, the contrast can be adjusted similarly as a state of seeing an object from eyes of a human being. In FIG. 3, the ordinate axis corresponds to the filter factor and represents the degree of intensity of the filter, while the abscissa axis represents the spacial frequency (Hz).

The contour extraction unit 22 performs the filter processing for the respective image data $D10_1$ to $D10_{10}$, and sends image data $D11_1$ to $D11_{10}$ acquired as the result of the filter processing to the histogram generation unit 23 and feature extraction unit 25.

Figure 4:
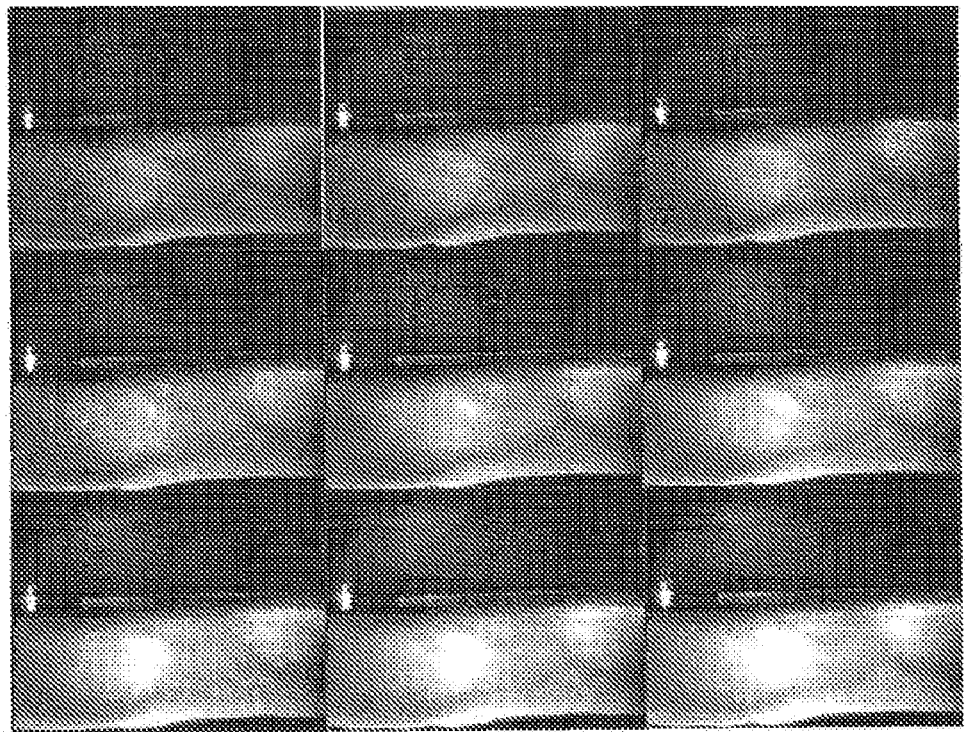
FIG. 4 shows images which are picked up under respective exposure values.
Figure 4:
Figure 5:
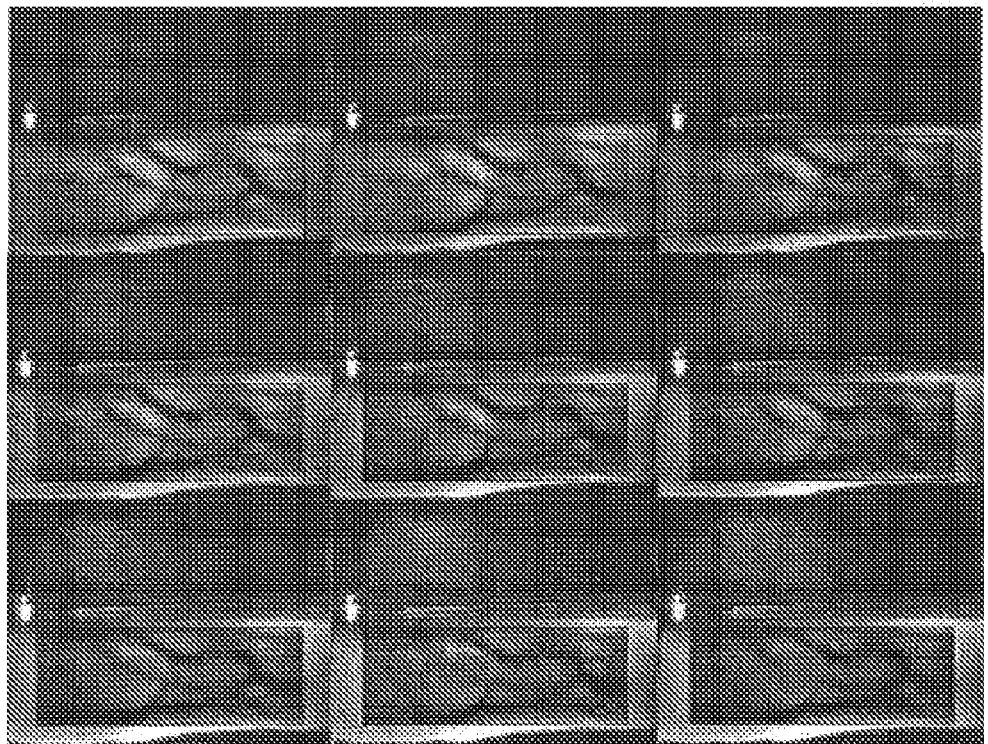
FIG. 5 shows images under respective exposure values which are filtered.
Figure 5:

Images (image data $D10_1$ to $D10_{10}$) picked up under the respective exposure values of ten stages are shown in FIG. 4, while images (image data $D11_1$ to $D11_{10}$) acquired after the filter processing is performed for the picked up images are shown in FIG. 5. In the respective images of a finger shown in FIG. 4 and FIG. 5, whitish part corresponds to fat, while blackish part in the form of a line corresponds to a blood vessel pattern (referred to as part corresponding to blood vessel, hereinafter).

As is apparent from FIG. 4 and FIG. 5, it can be seen that, in all the images corresponding to the respective exposure values, since the contrast is enhanced, while the part corresponding to blood vessel is unclear before the filter processing, the part corresponding to blood vessel becomes clear after the filter processing (rectangular areas in FIG. 5).

(2-3) Histogram Generation Processing

The histogram generation unit 23 generates histograms of the image data $D10_1$ to $D10_{10}$ before the filter processing is performed by the contour extraction unit 22 (referred to as histograms before filtering), and histograms of the image data $D11_1$ to $D11_{10}$ after the filter processing is performed (referred to as histograms after filtering).

Specifically, by generating the distribution of luminance values in an image with pixels being the frequency, and carrying out the normalization with the variance representing the broadening of the distribution set to "1", the histogram generation unit 23 generates the histograms before filtering and histograms after filtering corresponding to the respective exposure values of ten stages.

Figure 6:
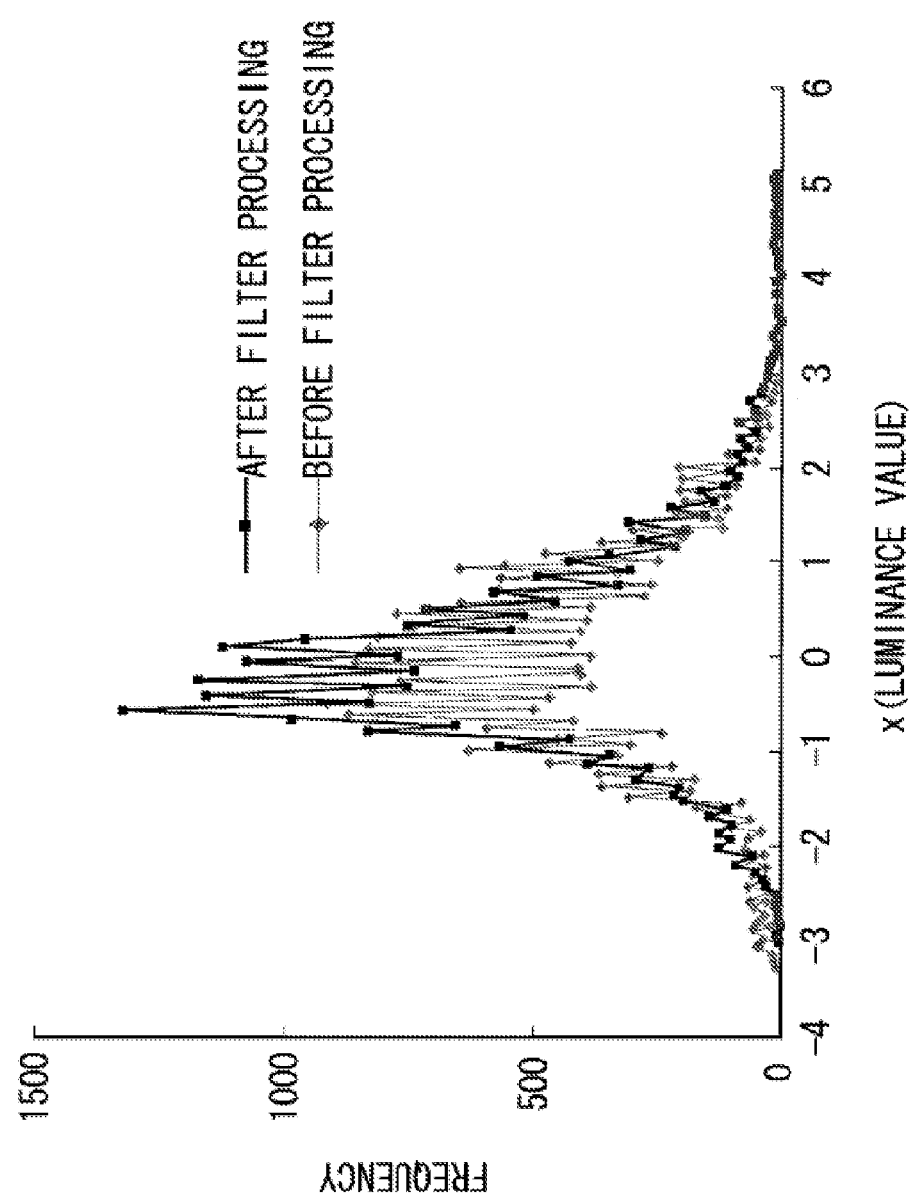
FIG. 6 shows a graph indicative of normalized histograms (exposure value "10") before and after filtering.
Figure 7:
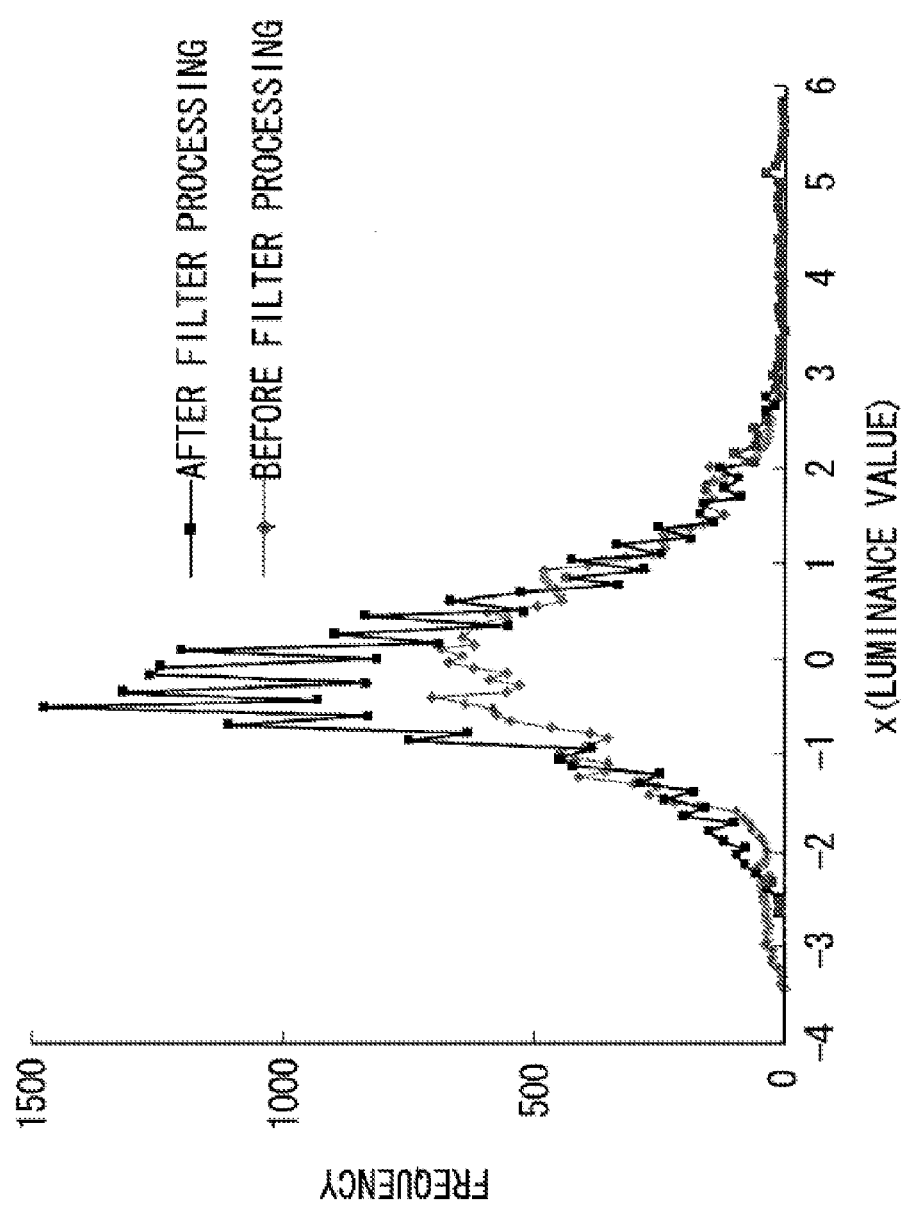
FIG. 7 shows a graph indicative of normalized histograms (exposure value "50") before and after filtering.

FIG. 6 shows histograms before and after filtering corresponding to an exposure value "10", while FIG. 7 shows histograms before and after filtering corresponding to an exposure value "50". As is apparent from FIG. 6 and FIG. 7, it can be seen that, in both the images corresponding to the respective exposure values, the distribution figuration of histogram after the filter processing is steep as compared with that before the filter processing.

This means that, as has been described by referring to FIG. 4 and FIG. 5, the part corresponding to blood vessel becomes clear (that is, part corresponding to blood vessel pattern is expressed). On the other hand, from FIG. 4 and FIG. 5, it can be seen that the degree of clearing up the part corresponding to blood vessel (value of expressing blood vessel pattern) in an image corresponding to the exposure value "50" is larger than that in an image corresponding to the exposure value "10".

The histogram generation unit 23 performs the histogram generation processing for the respective image data $D10_1$ to $D10_{10}$ and image data $D11_1$ to $D11_{10}$ before and after the filter processing, and sends histograms before filtering $D12A_1$ to $D12A_{10}$ and histograms after filtering $D12B_1$ to $D12B_{10}$ acquired as the result of the histogram generation processing to the optimum exposure determination unit 24.

(2-4) Optimum Exposure Determination Processing

The optimum exposure determination unit 24 determines the optimum exposure value for an object to be picked up based on the histograms before filtering $D12A_1$ to $D12A_{10}$ and histograms after filtering $D12B_1$ to $D12B_{10}$ corresponding to the respective exposure values.

Specifically, the optimum exposure determination unit 24 calculates the kurtosis of the normalized histograms before filtering $D12A_1$ to $D12A_{10}$ and histograms after filtering $D12B_1$ to $D12B_{10}$ respectively, and calculates the ratio between the kurtosis of the histogram before filtering and the kurtosis of the histogram after filtering for the exposure values of the respective stages ($D12A_1$:$D12B_1$, $D12A_2$:$D12B_2$, ..., $D12A_{10}$:$D12B_{10}$).

Then, of the ratios between the kurtosis of the histogram before filtering and the kurtosis of the histogram after filtering for the exposure values of the respective stages, the optimum exposure determination unit 24 determines that an exposure value corresponding to one of the stages whose ratio of the kurtosis is largest is the optimum exposure value with respect to an object to be picked up (finger), and sends data (referred to as optimum exposure data, hereinafter) D13 representing the optimum exposure value to the feature extraction unit 25.

The kurtosis will be explained briefly. The kurtosis represents the degree of sharpness of the distribution in a histogram, and, in case there is data (luminance value) "x" of "n" pixels, when the average of the data "x" is set to $X_{av}$ and the variance is set to "V", the kurtosis can be represented by the following mathematical expression (2).

$$K = \sum_{i=1}^{n} \frac{(x_i - x_{av})^4}{nV^2} - 3 \qquad (2)$$

In case the value of kurtosis "K" comes to be "0", it means that the histogram is a normal distribution. On the other hand, in case the value of kurtosis "K" is more than "0", it means that the histogram is a distribution which is sharper than the normal distribution, and the larger the value is, the larger the degree of sharpness of the distribution becomes. On the other hand, in case the value of kurtosis "K" is less than "0", it means that the histogram is a distribution which is flatter than the normal distribution, and the smaller the value is, the larger the degree of flatness of the distribution becomes.

Figure 8:
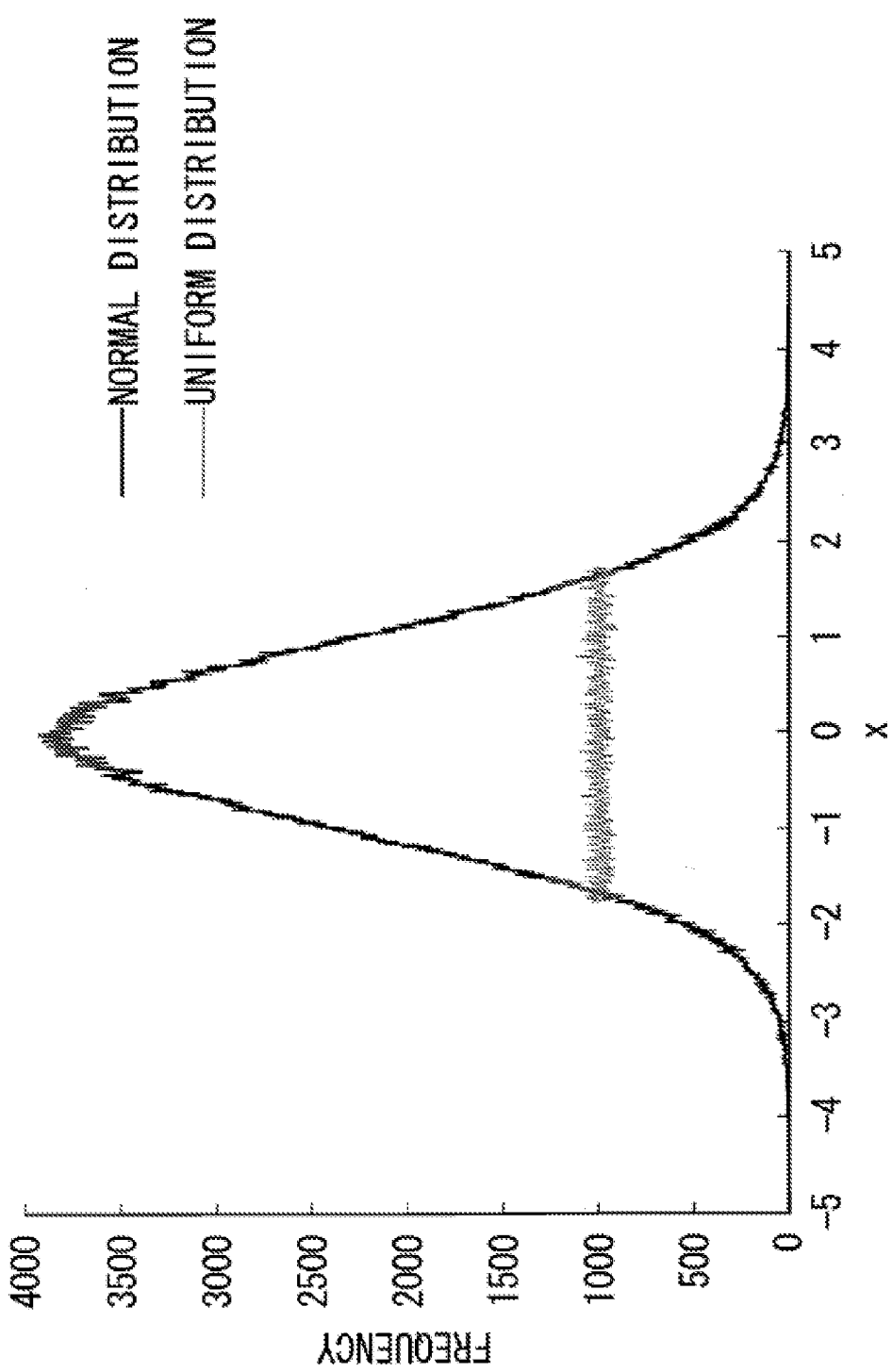
FIG. 8 shows a graph indicative of a normal distribution and a uniform distribution.

As shown in FIG. 8, when images of a normal distribution and images of a distribution which is substantially flat in the lateral direction (referred to as uniform distribution, hereinafter) are prepared by a million samples respectively, and the kurtosis thereof is obtained, the kurtosis of the normal distribution comes to be "0.0031" in every cases, while the kurtosis of the uniform distribution comes to be "−1.1987" in every case.

Furthermore, in the histograms shown in FIG. 6, the kurtosis of the distribution after the filter processing comes to be "1.928" and the kurtosis of the distribution before the filter processing comes to be "0.160", while in the histograms shown in FIG. 7, the kurtosis of the distribution after the filter processing comes to "4.393" and the kurtosis of the distribution before the filter processing comes to "0.268".

Accordingly, it can be seen that this kurtosis is a parameter that represents the degree of steepness in the distribution figuration of a histogram. Accordingly, as has been described by referring to FIG. 6 and FIG. 7, when the ratio between the kurtosis of the histogram before filtering and the kurtosis of the histogram after filtering is large, this means that, by the filter processing, the degree of clearing up the part corresponding to blood vessel (value of expressing blood vessel pattern) is made large.

Figure 9:
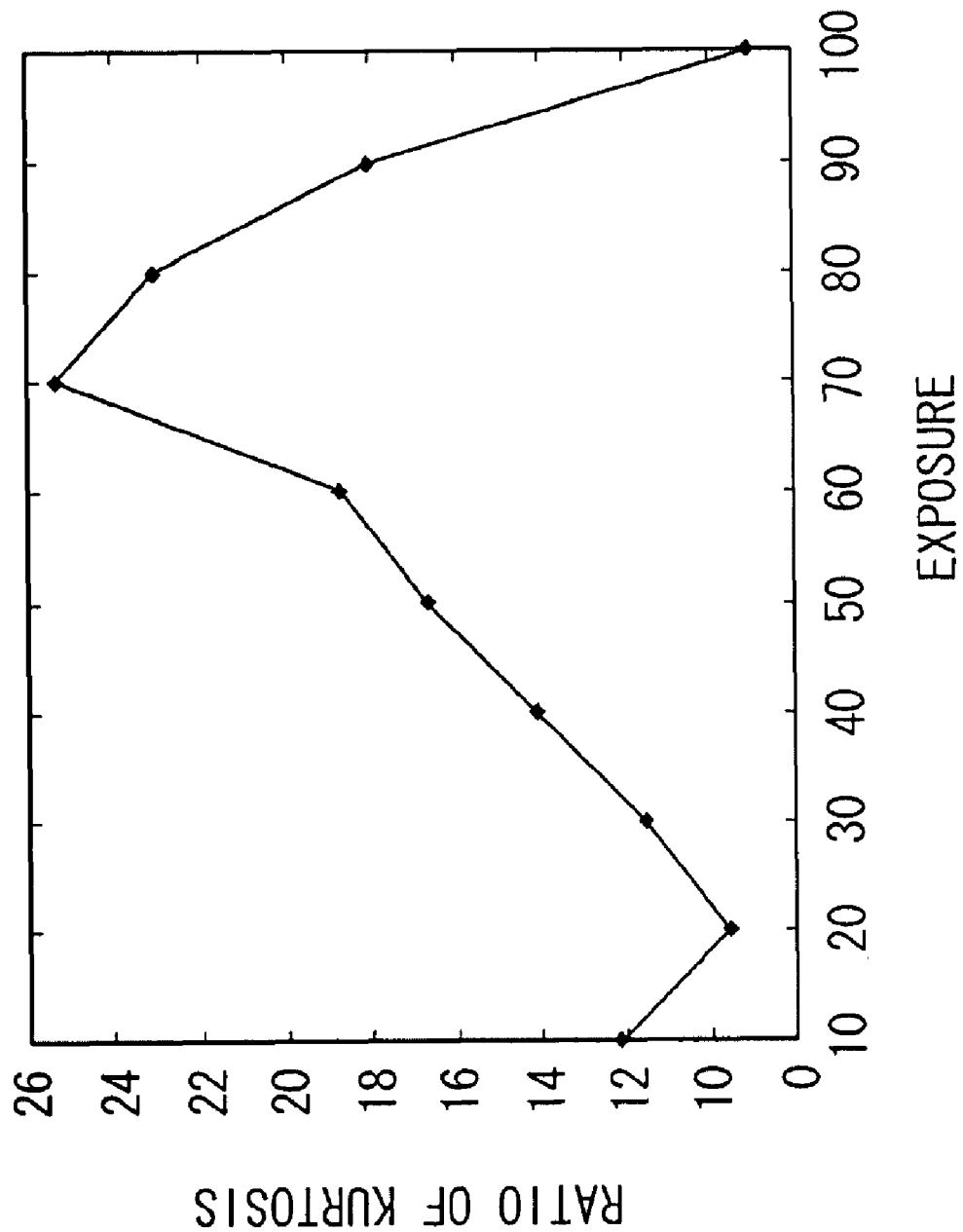
FIG. 9 shows a graph indicative of ratios of the kurtosis of the normalized histograms before and after the filter processing.
Figure 10:
FIG. 10 shows a picked up image of a blood vessel.

FIG. 9 shows ratios of the kurtosis of the histograms before and after the filter processing for the respective stages of the exposure values with respect to the respective images of the ten stages shown in FIG. 4. As is apparent from FIG. 9, since the optimum exposure value with respect to an object to be picked up (finger) is "70", the value of the optimum exposure data D13 to be sent to the feature extraction unit 25 comes to be "70".

(2-5) Feature Extraction Processing

Of the image data $D11_1$ to $D11_{10}$ supplied from the contour extraction unit 22, the feature extraction unit 25 selects, for example, the image data $D11_7$ which corresponds to the value of the optimum exposure data D13 supplied from the optimum exposure determination unit 24.

Then, for example, the feature extraction unit 25 extracts an object pattern (blood vessel pattern) by carrying out a predetermined smoothing processing such as the Gaussian filter processing, the binarization processing, and thinning processing for the selected image data $D11_7$.

In this way, the control unit 10 is adapted to perform the image acquisition processing, filter processing, histogram generation processing, optimum exposure determination processing, and feature extraction processing in series as the image processing.

The blood vessel pattern extracted as the result of the feature extraction processing is registered in the flash memory 13 as the registration data DIS in case of the blood vessel registration mode, while is collated with a blood vessel pattern of the registration data DIS as an object to be collated with respect to the registration data DIS in case of the authentication mode.

(3) Operation and Effect

In the above-described configuration, the authentication apparatus 1 sets up exposure values of ten stages in the image pickup unit 12, and extracts a blood vessel pattern by enhancing the contrast of the image signals $S1_1$ to $S1_{10}$ (or image signals $S2_1$ to $S2_{10}$) output from the image pickup unit 12.

Then, for the respective stages, the authentication apparatus 1 generates histograms before filtering for image signals before extraction and histograms after filtering for image signals after extraction with the broadening of the distribution in the histograms set constant, and calculates the ratio between the kurtosis of the histogram before filtering and the kurtosis of the histogram after filtering.

In this state, of the image data $D11_1$ to $D11_{10}$ after extraction corresponding to the respective stages, the authentication apparatus 1 selects the image data $D11_7$ after extraction corresponding to one of the stages in which the amount of change is larger than a predetermined amount as the optimum image for an object to be picked up.

Accordingly, by determining the luminance variation of images corresponding to the exposure values of the respective stages using the kurtosis of histograms thereof, even if the images are picked up images of a blood vessel, the authentication apparatus 1 can correctly determine the luminance variation. Furthermore, for the respective stages, by determining the luminance variation of images before and after extracting the contour of a blood vessel pattern, even if the blood vessel pattern of the picked up images is blurred, the authentication apparatus 1 can accurately select an image of an exposure value which is suitable for an object to be picked up.

Furthermore, under this configuration, even a general-purpose camera can pick up an image of a blood vessel, which makes it possible to mount a camera to a portable terminal device such as a cellular phone or a Personal Digital Assistant (PDA), and use the camera to pick up an image of not only a general object such as a person or a scenery but also a blood vessel.

In picking up an image of a blood vessel, a shutoff mechanism may be arranged so as to prevent visible light from coming into the light path of a near infrared ray. Since it is difficult to arrange the shutoff mechanism in case of picking up an image of not only a general object but also a blood vessel using a single camera, in this case, this configuration becomes especially useful.

(4) Other Embodiments

In the above-described embodiments, as a biological body pattern, a formation pattern of blood vessel (blood vessel pattern) is employed, to which the present invention is not restricted, and other various patterns of a fingerprint, a mouth, a nerve, etc. can be employed.

Furthermore, in the above-described embodiments, exposure values of ten stages are set up for an image pickup means (image pickup unit 12), to which the present invention is not restricted, and exposure values of two stages or more may be employed.

Moreover, in the above-described embodiments, by enhancing the contrast using a filter provided with the characteristics shown in FIG. 3, the contour of an object is extracted, to which the present invention is not restricted, and a Sobel filter or a Laplacian filter may be used, or a band-pass filter which extracts a frequency band (containing the margin corresponding to the individual difference) corresponding to a blood vessel pattern may be used.

Yet moreover, in the above-described embodiments, histograms are generated with the variance set to "1", to which the present invention is not restricted, and histograms may be generated so long as the broadening of the distribution in the histograms is set constant.

Yet moreover, in the above-described embodiments, the ratio between the kurtosis of the first histogram (histogram before filtering) and the kurtosis of the second histogram (histogram after filtering) is calculated, to which the present invention is not restricted, and other configurations may be employed so long as the amount of change of the kurtosis can be seen.

Yet moreover, in the above-described embodiments, the control unit 10 expands a program stored in a ROM on a RAM, and executes the image processing in accordance with the program, to which the present invention is not restricted, and the image processing may be executed in accordance with a program installed from a recording medium such as a Compact Disc (CD), a Digital Versatile Disc (DVD), a semiconductor memory, etc., or a program downloaded from the Internet.

Yet moreover, in the above-described embodiments, the image acquisition unit 21, contour extraction unit 22, histogram generation unit 23, optimum exposure determination unit 24, and feature extraction unit 25 are configured by software, to which the present invention is not restricted, and all or some of these units may be configured by hardware.

Yet moreover, in the above-described embodiments, the authentication apparatus 1 provided with the image pickup function, collating function, and registration function is employed, to which the present invention is not restricted, and various configurations may be employed according to various applications such as a configuration in which the authentication apparatus 1 is divided to individual devices for the respective functions.

The present invention can be applied to the field of the biometrics authentication.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    setup means for setting up exposure values of a plurality of stages for image pickup means;
    extraction means for extracting the contour of an object in image signals output from the image pickup means;
    generation means for generating first histograms for image signals before extraction and second histograms for image signals after extraction for the respective stages with the broadening of the distribution in the histograms set constant;
    calculation element for calculating the amount of change between the kurtosis of the first histograms and the kurtosis of the second histograms for the respective stages; and
    selection means for selecting, of the image signals after the extraction corresponding to the respective stages, an image signal after the extraction corresponding to one of the stages in which the amount of change is larger than a predetermined amount as an optimum image for an object to be picked up.

2. The image processing apparatus according to claim 1, wherein the extraction means is a filter that enhances the contrast of the image signals.

3. An image acquisition method that acquires an image picked up with the optimum exposure value with respect to an object to be picked up, the method comprising the steps of:
    a first step of setting up exposure values of a plurality of stages for image pickup element;
    a second step of extracting the contour of an object in image signals output from the image pickup element;
    a third step of generating first histograms for image signals before extraction and second histograms for image signals after extraction for the respective stages with the broadening of the distribution in the histograms set constant;
    a fourth step of calculating the amount of change between the kurtosis of the first histograms and the kurtosis of the second histograms for the respective stages; and
    a fifth step of selecting, of the image signals after the extraction corresponding to the respective stages, an image signal after the extraction corresponding to one of the stages in which the amount of change is larger than a predetermined amount as an optimum image for an object to be picked up.

4. A non-transitory memory comprising a program comprising the steps of:
    setting up exposure values of a plurality of stages for image pickup element;
    making control element for controlling the image pickup element extract the contour of an object in image signals output from the image pickup element;
    making the control element generate first histograms for image signals before extraction and second histograms for image signals after extraction for the respective stages with the broadening of the distribution in the histograms set constant;
    making the control element calculate the amount of change between the kurtosis of the first histograms and the kurtosis of the second histograms for the respective stages; and
    making the control element select, of the image signals after the extraction corresponding to the respective stages, an image signal after the extraction corresponding to one of the stages in which the amount of change is larger than a predetermined amount as an optimum image for an object to be picked up.

5. An image processing apparatus comprising:
    a processor, and
    a memory coupled to the processor,
    wherein the memory is encoded with one or more instructions that, when executed by the processor, define
    a setup unit that sets up exposure values of a plurality of stages for the image pickup unit;
    an extraction unit that extracts the contour of an object in image signals output from the image pickup unit;
    a generation unit that generates first histograms for image signals before extraction and second histograms for image signals after extraction for the respective stages with the broadening of the distribution in the histograms set constant;
    a calculation unit that calculates the amount of change between the kurtosis of the first histograms and the kurtosis of the second histograms for the respective stages; and
    a selection unit that selects, of the image signals after the extraction corresponding to the respective stages, an image signal after the extraction corresponding to one of the stages in which the amount of change is larger than a predetermined amount as an optimum image for an object to be picked up.

* * * * *